United States Patent
Schick et al.

(10) Patent No.: US 6,175,647 B1
(45) Date of Patent: Jan. 16, 2001

(54) METHOD AND SYSTEM FOR THREE-DIMENSIONAL SPATIAL POSITION DETECTION OF SURFACE POINTS

(75) Inventors: Jens Schick, Herrenberg; Werner Boesemann, Braunschweig, both of (DE)

(73) Assignees: Daimler-Benz Aktiengesellschaft, Stuttgart; Aicon-Industriephotogrammetrie und Bildverarbeitung GmbH, Braunschweig, both of (DE)

( * ) Notice: Under 35 U.S.C. 154(b), the term of this patent shall be extended for 0 days.

(21) Appl. No.: 09/083,094

(22) Filed: May 22, 1998

(30) Foreign Application Priority Data

May 26, 1997 (DE) .............................................. 197 21 903

(51) Int. Cl.[7] .................................................. G01C 11/00
(52) U.S. Cl. .......................................... 382/154; 382/152
(58) Field of Search .................................. 382/108, 141, 382/152, 153, 154, 314; 33/503; 367/907; 250/559.19, 559.22, 559.33, 559.29, 559.46; 356/375, 237.1, 290.1; 702/94, 95, 33–35, 40, 81, 82, 152, 153, 155–159, 166; 901/16, 44, 47; 348/42, 86, 87, 94, 95, 137

(56) References Cited

U.S. PATENT DOCUMENTS

| | | | |
|---|---|---|---|
| 4,647,206 | 3/1987 | Kunzmann et al. | 356/358 |
| 4,753,569 | * 6/1988 | Pryor | 414/730 |
| 5,404,649 | * 4/1995 | Hajdukkewicz et al. | 33/503 |
| 5,440,392 | 8/1995 | Pettersen | 356/375 |
| 5,646,732 | 7/1997 | Gerlach | 356/373 |
| 5,856,844 | * 1/1999 | Batterman et al. | 348/207 |
| 6,028,955 | * 2/2000 | Cohen et al. | 382/154 |

FOREIGN PATENT DOCUMENTS

| | | | |
|---|---|---|---|
| 195 14 815 | 10/1996 | (DE) | G01B/11/00 |
| 0 144 546 | 6/1985 | (EP) . | |
| 2 259 823 | 3/1993 | (GB) . | |

* cited by examiner

Primary Examiner—Leo H. Boudreau
Assistant Examiner—Brian P. Werner
(74) Attorney, Agent, or Firm—Foley & Lardner

(57) ABSTRACT

A method for the measured spatial 3D position detection of surface points of an object in a photogrammetric online system, in which a surface measurement point is touched by a probe tip. The spatial 3D position of the probe tip at the instant of touching is computed, with respect to a reference system, using an electronic camera. The computed 3D spatial position is stored as data. The electronic camera is rigidly connected to the probe, the camera being pointed away from the object at a target area which covers the volume to be measured. The target area has known reference points which form the reference system.

5 Claims, 2 Drawing Sheets

METHOD AND SYSTEM FOR THREE-DIMENSIONAL SPATIAL POSITION DETECTION OF SURFACE POINTS

BACKGROUND OF THE INVENTION

1. Field of the Invention

The invention relates to the online detection and measurement of three dimensional (3D) spatial points of an object surface in a 3D reference system.

2. Description of the Related Art

In a conventional photogrammetric offline system, the object to be measured is recorded by a user, who holds the camera freely, from various directions. In this case, the measurement points on the surface have to be signalled physically beforehand. In a later evaluation step, the 3D coordinates are then calculated for these signalled measurement points.

The photogrammetric offline system has the disadvantage that the measurement points have to be signalled physically. This requires a great deal of time. A further disadvantage is that the 3D coordinates of the measurement points are not available until significantly later in time than the actual recording of the object to be measured. This is because the recorded images cannot be subjected to further processing in the computer until later.

In order to determine coordinates in only one plane or in only one direction, German patent document DE 195 14 815 A1 discloses a coordinate measuring device having a measuring head, which can be moved on a guide unit along a scale on a slide, and having a probe for measuring a workpiece. The probe is fastened to a swivel body which is arranged such that it can swivel about a pivot on a slide which can be moved on the guide unit. Arranged on the swivel body are measuring heads assigned to the scale on both sides of the pivot, the measuring heads being arranged at a distance from the scale and from the pivot, in such a way that during measurement, the swivel body is displaced parallel to the scale, one coordinate being detected as a dimension in the longitudinal direction of the scale and evaluated for the purpose of coarse positioning. Once the probe has been placed onto the surface of the workpiece, the swivel body is swivelled about its pivot. For the purpose of fine positioning, one coordinate at right angles to the surface of the scale is detected as a measure of the distance between the measuring heads and the scale and evaluated. The measuring heads are designed as measuring cameras in which defined markings of the scale are projected, with the aid of an optical system, onto an image plane formed by a CCD linear array. The position and the height of the projection center of the measuring heads are determined from the measurement signals with the aid of a computer.

A conventional photogrammetric online system is described in, for example, U.S. Pat. No. 5,440,392, in which it has usually been necessary for arranging at least two cameras on a tripod or a similar device to be installed permanently, with installed cameras observing the object to be measured. The measurement points on the object to be measured are touched by a user with a mechanical probe on which there are measuring marks. The coordinates of these measuring marks are automatically determined and, therefore, so too is the position of the measuring tip and the coordinates of the measurement point.

A significant disadvantage of this online system is that the cameras have to be constructed such that they are stable and stationary at all times, and that the cameras permit only a limited volume to be measured, specifically only the area which is covered at least by two cameras. At present, this area is only approximately 1 m² in size if accuracies in the region of less than 1/10 mm are to be achieved. Since, in practice, this volume to be measured is frequently insufficient, the position of the cameras must be changed in order to be able to detect a wider area in the volume to be measured, for example, in the case of an object to be measured formed by a vehicle. However, this moving of the cameras requires that the system be completely recalibrated each time, and is thus particularly time-consuming and inconvenient.

SUMMARY OF THE INVENTION

Therefore, it is a general object of the invention to alleviate the problems and shortcomings identified above.

Another one of the objects of the present invention is improving the conventional online method and system such that even large volumes to be measured can be measured with little measurement outlay, with the measurement accuracy remaining the same.

These and other objects are achieved by providing a probe rigidly connected to an electronic camera, the camera being pointed away from the object to be measured at a target area which completely or partially covers the volume to be measured, at a distance from the object to be measured, and has reference points which are known in terms of their spatial position and in this respect are, invariant within the measurement accuracy during measurement and are extensively distributed, with the reference points forming the reference system.

To achieve the objects of the invention, a system is also provided that has the following features:

a) an electronic camera rigidly connected to a probe;

b) a reference system on a stationary target area, which completely or partially covers the volume to be measured, at a distance from the object to be measured, and has a plurality of reference points, which are known in terms of their spatial position, can be optically distinguished and are extensively distributed; and c) the electronic camera is directed at the target area.

This arrangement makes it possible to detect any volume to be measured with the measurement accuracy being the same. The volume to be measured is no longer limited by the position and recording direction of cameras but rather by the volume covered by the target area with its reference points. This target area may be a simple dimensionally stable wall in front of which the object to be measured is set up. Alternatively, the target area may be formed by portable plates which can be set up in the vicinity of the object to be measured. It is also possible to equip an entire production facility with reference points, with the result that at any location within the production facility, the 3D coordinates can be determined by the method or the system according to the invention.

In a preferred embodiment, the target area may be formed by a target canopy which spans the volume to be measured. In all the embodiments, the reference points need to be determined only once during the set up of the system. It is important that the reference points, which are known in terms of their spatial position, are invariant within the measurement accuracy (tolerance) during measurement. Moreover, the reference points must be created such that with their identification, despite their extensive arrangement on the target area, a position point can be assigned to each reference point unambiguously with the desired measurement accuracy.

The method according to the invention also permits the 3D coordinates of a measurement point to be determined immediately (online), and, therefore, complicated calculation processes such as in offline photogrammetry are unnecessary.

The measuring probe according to the invention also affords a cost-effective alternative to previously known methods in that higher accuracy that can be achieved not only by high sensor resolutions but can also be realized using standard CCD cameras.

The method according to the invention can be implemented using just a single camera. Preferably, however, the probe is equipped with three electronic cameras, which are arranged such that they are peripherally offset with reference to a peripheral line about the probe axis. The optical axis of each camera forms an acute angle with the probe axis.

Constant calibration during measurement presupposes the identification of three reference points in each camera. Should such calibration be unnecessary during continuous measurement on account of a sufficiently rigid structure of the measuring probe, it suffices to identify two reference points per camera. The calibration could then be performed once daily or else before each measurement task in a separate calibration station.

The probe tip is preferably inserted into the probe in a manner that allows it to be exchanged. This makes it possible to use probe tips of different lengths, and optionally of different shapes. Angular probe tips are preferable if the measurement points are not directly accessible.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF PREFERRED EMBODIMENTS

The invention relates to a method for the measured spatial 3D position detection of surface points of an object to be measured in a photogrammetric online system, a respective surface point to be measured (measurement point) being mechanically touched by the tip of a probe, after which the spatial 3D position of the probe tip at the instant of touching is determined, with respect to a reference system, using at least one electronic camera, and 3D spatial coordinates that have been determined are stored as data.

The invention furthermore relates to a system for the measured spatial 3D position detection of surface points of an object to be measured in a photogrammetric online system, having a probe for mechanically touching a respective surface point to be measured (measurement point) by means of a probe tip, having at least one electronic camera for determining the spatial 3D position of the probe tip at the instant of touching with respect to a reference system, and having a computer, which is connected to the at least one electronic camera and serves for automatic evaluation of the images communicated by the at least one camera and for determining the 3D spatial coordinates of the probe tip with the aid of a corresponding calculation program.

Figure 1:
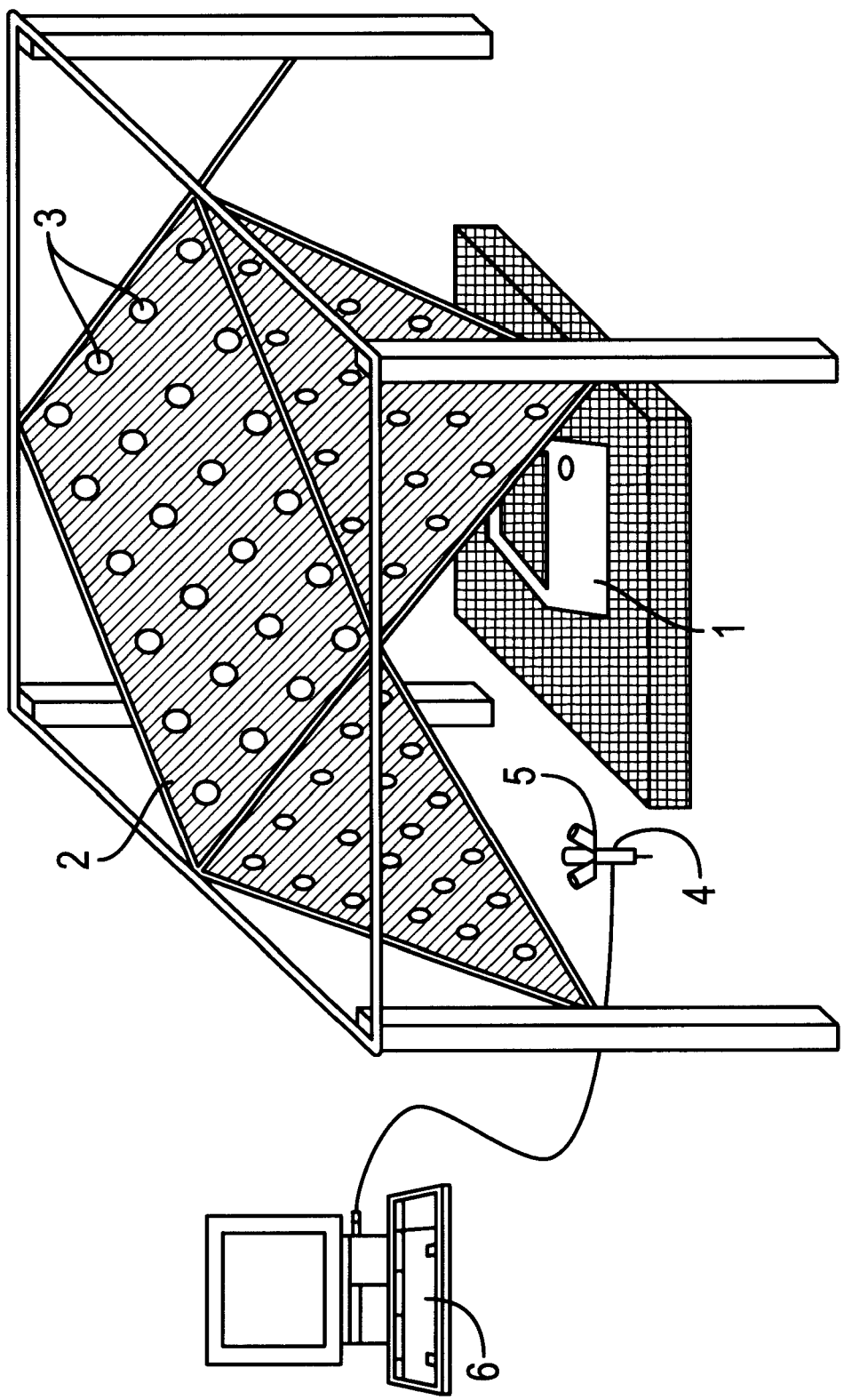
FIG. 1 shows a system for the measured position detection of surface points of an object to be measured.

With reference to the figures, FIG. 1 illustrates a preferred embodiment of a system for the measured spatial position detection of surface points of an object 1 to be measured. The system has, as a reference system, a target area 2, which is designed as a target canopy spanning the volume to be measured and has a plurality of highly accurately calibrated reference points 3.

Figure 2:
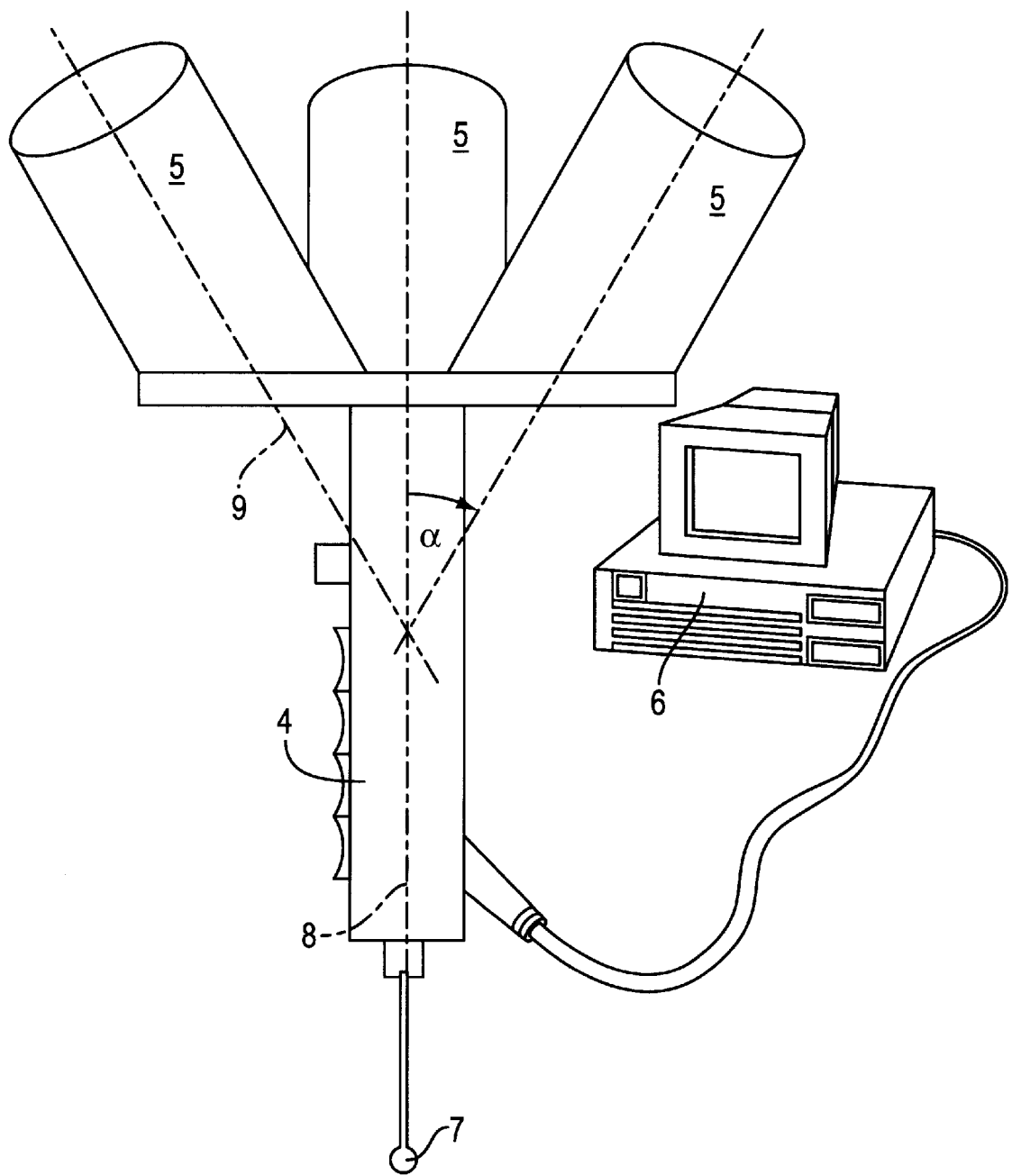
FIG. 2 shows the probe indicated in FIG. 1 on an enlarged scale.

The system furthermore includes a probe 4, the upper end region of which is equipped with three electronic cameras 5, as shown in FIG. 2, which are connected directly or indirectly to a standard computer 6, such as a Personal Computer (PC) or a Workstation. The lower end of the probe 4 is equipped with an exchangeable probe tip 7. The three electronic cameras 5 are arranged such that they are peripherally offset with reference to a peripheral line about the probe axis 8. The optical axis 9 of each camera 5 forms an acute angle $\alpha$ with the probe axis 8, the angle preferably being about 25°.

The surface points to be measured of the object 1 are mechanically touched by the probe tip 7. The cameras 5 fastened rigidly to the probe 4 are oriented toward the target area 2 and hence to the reference points 3 thereof, and serve for determining the spatial position of the probe tip 7 at the instant of touching with respect to the target area 2 in terms of the reference system 3. The computer 6 evaluates the images communicated from the cameras 5 and, with the aid of a corresponding calculation program, determines the 3D coordinates of the probe tip 7 and thus of the respective measurement point.

One skilled in the art would be able to develop a suitable calculation program. An example of similar calculation program is described in, for example, Konecny, G, Lehmann, G. "Photogranmetrie"; Berlin: N.Y.: de Gruyter, 1984, pp. 122–126.

Each electronic camera 5 is equipped with a planar-array CCD chip which has a minimum size of 512×512 pixels, but can also have any other size, such as an intermediate size up to a maximum size of 4000×4000 pixels that is presently available.

Other embodiments of the invention will be apparent to those skilled in the art from a consideration of the specification and practice of the invention disclosed herein. It is intended that the specification be considered as exemplary only, with the true scope and spirit of the invention being indicated by the following claims.

What is claimed is:

1. A system for a measured 3D spatial position detection of surface points of an object to be measured in a photogrammetric online system, comprising:

a probe for mechanically touching a surface measurement point by means of a probe tip;

at least two electronic cameras rigidly connected to the probe for determining a 3D spatial position of the probe tip, at the instant of touching, with respect to a reference system;

wherein said reference system being designed as a stationary target canopy which spans in three dimensions and completely covers the volume containing the object to be measured, at a distance from the object to be measured;

wherein said electronic cameras being arranged peripherally offset with reference to a peripheral line about a probe axis and being directed at the target canopy, wherein an optical axis of each electronic camera forms an acute angle α of a same amount with the probe axis and;

wherein the target canopy has a plurality of reference points of known spatial positions that are distributed over the three dimensional target canopy and the reference points can be optically distinguished from each other, and wherein the reference points on the target canopy are arranged close together so that each of the electronic cameras detects three reference points simultaneously, and a computer, connected to the electronic cameras, which automatically evaluates images communicated by the cameras and determines the 3D spatial position of the probe tip in the reference system, at the instant of touching.

2. The system according to claim 1, wherein the probe is equipped with three electronic cameras.

3. A system according to claim 1, wherein the amount of said acute angle α is approximately 25°.

4. The system according to claim 1, wherein the electronic cameras are equipped with a planar-array CCD chip, having a minimum size of 512×512 pixels.

5. The system according to claim 1, wherein the probe can be equipped with exchangeable probe tips having different shapes and/or lengths.

* * * * *